March 8, 1960 R. H. HUDDLESTON, JR 2,928,039
CONSTANT ELECTROMAGNETIC FIELD WELL LOGGING SYSTEM
Filed Oct. 5, 1956

INVENTOR.
RICHARD H. HUDDLESTON JR.,
BY *James M. Peppers*

AGENT.

2,928,039
Patented Mar. 8, 1960

2,928,039

CONSTANT ELECTROMAGNETIC FIELD WELL LOGGING SYSTEM

Richard H. Huddleston, Jr., Houston, Tex., assignor, by mesne assignments, to Welex, Inc., a corporation of Delaware Application October 5, 1956, Serial No. 614,196

8 Claims. (Cl. 324—1)

This invention generally relates to systems for logging electrical conductivity of earth formations traversed by a well bore, and more particularly relates to an electromagnetic system for detecting and transmitting an indication of such conductivity, said system having means of producing a constant electromagnetic field in said formations.

This application is co-pending with the application to Richard H. Huddleston, Jr., entitled, Electromagnetic Well Logging System, Serial Number 614,194, filed October 5, 1956.

As discussed in the above cited co-pending application, electromagnetic systems for logging well bore formations are widely known and have been used with particular success in the logging of well bores containing non-conductive fluids, or no fluids at all. In such systems that provide at least one exciting coil in electromagnetic coupling with the surrounding formation and at least one separate receiving coil, problems have arisen in attempts to eliminate all other variables not indicative of the formation conductivity.

As the formation is excited, eddy currents are induced in the formation which produce a secondary magnetic field. The intensity of this secondary field is commensurate with those eddy currents produced, which in turn vary in response to the conductivity of the formation. If a direct measurement of this secondary field is expected to produce a true indication of the formation conductivity, it is clearly seen that the intensity of the exciting flux field must remain constant.

To maintain a constant exciting flux field, a constant current must be maintained through the exciting coil even though the coil is shunted, in effect, by eddy currents produced in the surrounding formation. This shunting effect of the exciting coil, having variation responsive to the conductivity variation of the formation, requires proportionate exciting voltage variation to impress such constant current through the coil.

It is therefore the general object of this invention to provide an improved electromagnetic system for detecting the relative conductivity of earth formations which features improved means for producing a constant electromagnetic flux field in said formations.

In accordance with the present invention, an electromagnetic logging system adapted to traverse a well bore in electromagnetic coupling with the well formation is provided, including an exciting coil to produce an electromagnetic flux field in the well formation axially aligned with at least one receiver coil separated a preselected distance from the exciting coil. Voltage is induced in the receiver coil in response to formation eddy currents produced by the field. Means to maintain a flux in the formation is provided by a capacitance connected in series with the exciting coil to form an oscillating circuit. A constant current is maintained through the exciting coil by the output of a supply means connected with the oscillating circuit to drive said oscillating circuit at frequency and magnitude responsive to a voltage input to said supply means. A first diagonal of a Wheatstone resistance bridge is connected in responsive series relation to the current flowing through the oscillating circuit, said bridge having one resistor of different temperature resistance coefficient than the other three resistors. A second diagonal of the bridge is connected to provide a control voltage to the supply means of magnitude responsive to temperature variation created in said resistors by the current through the oscillating circuit and of frequency established by the oscillating circuit. Means responsive to the phase and frequency of the oscillating circuit is provided in connection with said circuit to separate the voltage induced in said receiver coil by the formation eddy currents from the voltage directly induced in said receiver coil by the exciting coil and to vary a subcarrier frequency in response only to said eddy current induced voltage. A frequency modulated transmission means is modulated by said subcarrier frequency and the receiving and indicating means is provided to indicate variations of, said modulated frequency.

For a more detailed explanation of the invention and for further objects and advantages thereof, reference may now be had to the following description taken in conjunction with the drawing in which.

Figure 1:
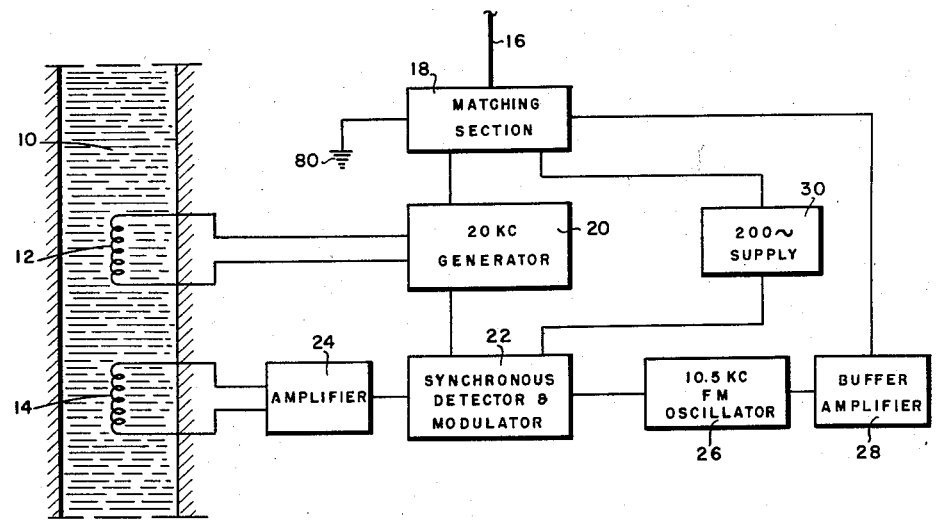
Figure 1 is a schematic view of an embodiment of the present invention.

Now referring to Figure 1, there is shown suspended in a well bore 10 by a single conductor cable 16 an exciting coil 12 and a receiver coil 14. Exciting coil 12 is connected to a constant current exciting generator 20, later described in detail. The operation of this generator 20 is not limited to any particular frequency and is herein described as operating at a frequency of 20 kilocycles. Power to exciting generator 20 is supplied through a matching section 18 from cable 16. Such power could be either alternating or direct current and, if alternating, of any frequency suitable for power transmission. As presently used in practice and herein exampled, such power is 400 cycles alternating current.

Generator 20 is connected into a phase sensitive synchronous detector and modulator 22 to furnish a reference voltage thereto of like phase and frequency as that current impressed through exciting coil 12. Receiver coil 14 is connected through an amplifier 24 into synchronous detector and modulator 22. Also connected into detector and modulator 22 is a low frequency reference voltage supply 30 having a frequency of 200 cycles, for example. Voltage supply 30 is connected to matching section 18 to receive power from cable 16. Detector and modulator 22 is connected into a frequency modulated oscillator 26, herein exampled as having a center frequency of 10.5 kilocycles. Oscillator 26 is connected through a buffer amplifier 28 into matching section 18 and cable 16.

Equipment is provided at the surface of the earth to discriminate and indicate the output of F.M. oscillator 26 which is generally well known and presently in use. Such equipment is therefore not illustrated or described herein. Reference may be had to Pat. No. 2,573,133 to Greer for a clear description and illustration of such equipment.

In operation generator 20, supplied with power from cable 16 through matching section 18, supplies a constant alternating current to the exciting coil 12. Produced by said constant exciting current is a constant flux electromagnetic field in the formation surrounding well bore 10. Eddy currents are induced about well bore 10 in response to said field which will vary in response to the conductivity of said formation. Receiver coil 14 is provided in spaced relation to exciting coil 12 and has a voltage induced therein which is a composite of a voltage directly induced by exciting coil 12 and secondarily induced by the formation eddy currents. Such directly induced voltage is at 90° with respect to the exciting current. The secondarily induced voltage is at 180° with respect to the exciting current and varies in direct response to the conductivity of said formation.

The composite voltage induced in receiver coil 14 feeds through amplifier 24 into synchronous detector and modulator 22. Detector and modulator 22, which receives an in-phase reference voltage from generator 20 and a sub-carrier frequency voltage from 200 cycle reference voltage supply 30, detects only that voltage component produced by said eddy currents, hereinafter called the 180° induced voltage. This 180° voltage, which varies in amplitude responsive to the conductivity of said formation, modulates the 200 cycle reference voltage. This modulated 200 cycle voltage serves as a sub-carrier to modulate oscillator 26 in response to the conductivity of said formation. The output of oscillator 26 feeds through an amplifier 28, herein illustrated as a buffer amplifier, through matching section 18 and cable 16 to the surface of the earth. At the earth's surface this frequency modulated signal is discriminated and amplified for subsequent indication or recording as disclosed in the above cited patent to Greer.

It is therefore seen that the 180° component of the composite voltage induced in coil 14, if such 180° voltage is induced by a constant electromagnetic field, will be truly indicative of the formation conductivity and may be accurately detected and transferred to the earth's surface for indication or recording. To provide such a field it is also seen that a constant current must be maintained through exciter coil 14.

Figure 2:
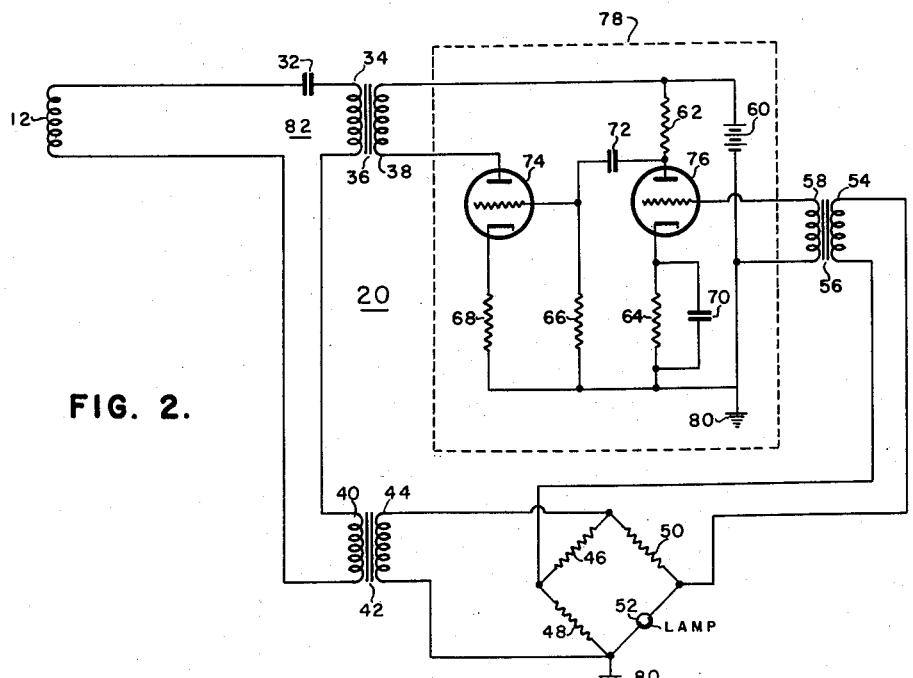
Figure 2 is a schematic embodiment of a constant current oscillating circuit provided by this invention.

Now referring to Figure 2, there is illustrated in detail a suitable and preferred circuit for exciting generator 20. A series oscillating circuit 82 is provided by series connection of exciter coil 12 with a capacitor 32. Oscillating circuit 82 is connected to a secondary coil 34 of a power transformer 36 and a primary coil 40 of a current transformer 42. A secondary coil 44 of current transformer 42 is connected across the first diagonal of a resistance bridge containing resistors 46, 48, 50, and 52. One terminal of secondary coil 44 is connected to the junction of resistors 46 and 50. The other terminal of secondary coil 44 is connected to the junction of resistors 48 and 52 and to ground 80. A primary coil 54 of a voltage transformer 56 is connected to said bridge with one terminal of primary coil 54 connected to the junction of resistors 46 and 48, and the other terminal of primary coil 54 connected to the junction of resistors 50 and 52.

A direct current power supply 60, resistors 62, 64, 66, and 68, capacitors 70 and 72, and vacuum tube triodes 74 and 76, connected as illustrated, provide a simple power amplifier 78. A secondary coil 58 of voltage transformer 56 provides the input voltage to amplier 78. A primary coil 38 of transformer 36 is provided to receive the power output from amplifier 78.

As herein illustrated, amplifier 78 is provided as a convenient example to describe the invention. Other amplifiers of any conventional design, capable of supplying the required power, and having substantially no phase shift at the operating frequency would be suitable. It is then seen that transformer 36, which may be considered a component of presently provided amplifier 78, is also an example means preferred for this amplifier. Direct current power supply 60, herein exampled simply as a battery, may be a source rectified from the previously disclosed 400 cycle power supply.

In operation, circuit 82 oscillates at a resonance frequency determined solely by capacitor 32 and the inductance of coil 12, the arrangement being such that said resonance frequency will be a desired operating frequency of exciting coil 12. When said series circuit is at resonance the load on amplifier 78 then becomes purely resistive.

Now, with the circuit at resonance, the inductive and capacitive reactances of said circuit cancel out, leaving only a small resistive component. Said circuit, now having minimum impedance, will permit maximum current flow therethrough. It is also pointed out that when said circuit is at resonance, the impedance phase angle becomes zero.

Current flowing through coil 40 of current transformer 42 induces a directly proportional current in coil 44. Such induced current flows through the bridge network provided by resistors 46, 48, 50, and 52 and will develop a potential across each individual resistor proportional to the amplitude of such current and in-phase with such current. Now, if resistors 46 and 50 were of equal value and resistors 48 and 52 were of equal value, there would be no potential developed between the junction of resistors 46 and 48 and the junction of resistors 50 and 52. However, if resistors 48 and 52 are of unlike value, there will be a potential developed between said junctions.

As herein provided, resistors 46, 48, and 50 preferably have a negligible or very low temperature coefficient of resistance. Resistor 52 is of non-linear nature with a relatively large temperature coefficient of resistance. This coefficient may be either positive or negative. An example of a positive coefficient type resistor which has been used with success in the present embodiment is a tungsten filament lamp. An example of a negative coefficient type resistor which may be used is the "thermistor."

Primary coil 54 of voltage transformer 56 is connected across said bridge network with one terminal connected to the junction of resistors 46 and 48 and the other terminal connected to the junction of resistors 50 and 52. Secondary coil 58 of voltage transformer 56 has one terminal connected to the grid of triode 76 and the other terminal connected to ground. Now, with the current induced in coil 44 flowing through said bridge network, the potential developed across the resistor 48 is adapted to supply a positive or regenerative voltage to the grid of triode 76. The potential developed across resistor 52 is adapted to supply a negative or degenerative voltage to the cathode of triode 76.

It can be seen that a minute increase of current flow in series circuit 82 will concurrently cause increased current flow through the resistance bridge network. The temperature of each resistor will therefore increase in response to such current flow. Now, with resistor 52 having a positive temperature coefficient of resistance, a small increase of current flow, i.e., a small temperature rise, will cause a marked increase in the resistance of said resistor and thereby reduce the effective positive voltage applied to the grid of triode 76. Thus the power output of amplifier 78 is reset to a lower level. It is thus seen that minute deviations of current flow through series circuit 82 will cause immediate counteracting adjustments of output amplifier 78. It is pointed out that changes in the current in exciting coil 12 may tend to result from changes in amplifier gain as well as the previously mentioned effective shunting by conductive media in the vicinity of exciting coil 12. Changes of this nature are also compensated in the previously described manner.

The bridge network is initially adjusted to provide sufficient net potential difference across resistors 48 and 52 to maintain an amplifier output required for a desired current flow in series circuit 82.

As heretofore disclosed, resistor 52 has a large non-linear temperature coefficient resistance, said coefficient being either positive or negative. It is now seen that a change in current flow through the previously described resistance bridge will cause temperature changes in direct response thereto. The temperature coefficient differences between resistor 52 and resistors 46, 48, and 50 therefore cause the net potential voltage difference desired for control of amplifier 78. It is also obvious that resistor 52 may be of the low coefficient type and resistors 48, 50, and 52 be of the non-linear coefficient type. When the bridge is provided in this manner an increment of current increase across said bridge would cause a sharp rise in resistance of resistors 46, 48, and 50 and cause no rise in resistor 52. A control potential would again be evident to control amplifier 78.

It is obvious that such changes, when made in the resistance bridge, would require that the respective junctions of said bridge be properly connected to the grid and cathode of triode 76.

It is also pointed out that, to insure proper operation of the circuit as illustrated in Figure 2, proper phasing of the transformers 36, 42, and 56 must be observed. It is further pointed out that, if desired, current transformer 42 and voltage transformer 56 could be omitted and yet retain the essence of operation provided by this invention. When such transformers are omitted one terminal of secondary coil 34 would then be connected to the junction of resistors 46 and 50, and one terminal of exciting coil 12 would be connected to the junction of resistors 48 and 52 and to ground. Also, the junction of resistors 46 and 48 would be connected to the grid of triode 76 and the junction of resistors 50 and 52 would be connected to the cathode of triode 76. As shown in Figure 2, the junction of capacitor 70 and resistor 64 would be connected to the junction of resistors 50 and 52 rather than to ground.

When connected in this alternate manner, the resistance bridge heretofore described would comprize a directly connected series resistance component of circuit 82 rather than a responsively series related component as previously described. It is therefore pointed out that impedance caused by inclusion of this bridge in either manner into circuit 82 would be purely resistive and thus not be frequency sensitive.

It is now seen that any losses occurring in circuit 82, both internally caused and through inductive coupling with some variable loss non-magnetic medium, would not vary a current level previously established in said circuit. It is also obvious that the feedback network does not utilize any reactive components and thus is not frequency sensitive. It is further pointed out that the frequency at which exciting coil 12 is excited is determined by the series circuit 82 and is therefore independent of inductive loading by any medium having unity magnetic permeability.

The current generator 20 described and illustrated herein, when used in an electromagnetic logging system as described, will therefore supply an excitor coil 12 with a constant current even though said coil is subjected to variable loss mediums. It is further obvious that passage of a constant current through excitor coil 12 will establish a constant flux electromagnetic field about said coil. Thus, in the logging system illustrated and described herein, the magnetic field in a formation about exciting coil 12 will remain constant. The eddy currents induced in a formation will therefore vary only in response to the conductivity of said formation.

While only one embodiment of the invention has been illustrated and described herein, it is obvious that various changes may be made without departing from the scope and spirit of the invention as defined in the annexed claims.

That being claimed is:

1. An electromagnetic logging system adapted to traverse a well formation and produce a constant flux field in coupling with said formation, comprizing, an electromagnetic field exciting coil, a capacitance connected in series with said coil to form an oscillating circuit, a resistance bridge circuit having a first, a second, a third and a fourth resistor connected in series to have current flow from the junction of said first and third resistor to the junction of said second and fourth resistor in responsive series relation to current flow through said oscillating circuit, said current through said bridge adapted to create a temperature in said resistors corresponding to said current, said first, second and third resistors having a low linear temperature coefficient of resistance, and said fourth resistor having a high non-linear coefficient of resistance, such that a change of potential will be created across the junction of said first and second resistors and the junction of said third and fourth resistors upon a change of temperature of said resistors, and amplifier means to supply current in said oscillating circuit in response to said potential change across said bridge, a receiving coil longitudinally separated in axial alignment from said exciting coil to produce a voltage in response to eddy currents created by said electromagnetic field, means responsively connected to said oscillating circuit to vary a signal transmission means in response to detection of the voltage induced only by said eddy currents, and receiving and indicating means to indicate variations of said transmission means.

2. A system for producing a constant electromagnetic field in a well formation in response to a constant current passing through an exciting coil adapted for electromagnetic coupling with said formation, comprising, an oscillating circuit having a capacitor and said exciting coil connected in series therein, a resistance bridge circuit, including a first, a second, a third and a fourth resistor connected in series, having the current of said oscillating circuit flow through a first diagonal, said current adapted to create a temperature in said resistors corresponding to said current, said first, second, and third resistors having a low linear temperature coefficient of resistance, and said fourth resistor having a high non-linear temperature coefficient of resistance, and amplifier means to supply current in said oscillating circuit in response to potential appearing across a second diagonal of said bridge, said potential being a function of said oscillating circuit current magnitude.

3. A system for producing a constant electromagnetic field in a formation traversed by a well bore, comprizing, an exciting coil adapted for electromagnetic coupling with the surrounding formation, a capacitance connected in series with said coil to form an oscillating circuit, a resistance bridge circuit having a first, a second, a third and a fourth resistor connected in series to have current flow from the junction of said first and third resistor to the junction of said second and fourth resistor in responsive relation to current flow through said oscillating circuit, said current through said bridge adapted to create a temperature in said resistors corresponding to said current, said first, second, and third resistors having a first temperature coefficient of resistance, and said fourth resistor having a second coefficient of resistance, such that a change of potential will be created across the junction of said first and second resistors and the junction of said third and fourth resistors upon a change of temperature of said resistors, and amplifier means to supply current in said oscillating circuit in response to said potential change across said bridge.

4. A system for producing a constant electromagnetic flux field in a surrounding media of varied conductivity in response to a constant current passing through an exciting coil, comprising, an oscillating circuit having a capacitor and an exciting coil adapted to produce said flux field connected in series therein, a resistance bridge circuit, including a first, a second, a third, and a fourth resistor connected in series, having current flow therethrough in series connection with said oscillating circuit, said current adapted to create a temperature in said resistors corresponding to said current, said first, second, and third resistors having a low temperature coefficient of resistance, and said fourth resistor having a high temperature coefficient of resistance, and means to supply current in said oscillating circuit in response to a potential across said bridge, said potential being responsive to said temperature of said resistances.

5. An electromagnetic logging system adapted to traverse a well formation and produce a constant electromagnetic field in said formation, comprizing, an electromagnetic field exciting coil adapted for electromagnetic coupling with surrounding formation, a capacitance connected in series with said exciting coil to form an oscillating circuit, a resistance bridge circuit including a first, a second, a third and a fourth resistor connected in series, having current flow therethrough in response to current flow through said oscillating circuit, said current creating a temperature in said resistors corresponding to said current, said first, second, and third resistors having one temperature coefficient of resistance, and said fourth resistor having another temperature coefficient of resistance, and means to supply current in said oscillating circuit in response to a potential across said bridge, said potential being responsive to said temperature of said resistors, a receiver coil axially aligned in separated longitudinal relation from said exciting coil to produce a voltage in response to eddy currents created by said electromagnetic field, means responsive to said oscillating circuit to vary a signal transmission means in response to detection of only the voltage induced by said eddy currents, and receiving and indicating means to indicate variations of said transmission means.

6. A system for producing a constant electromagnetic flux field in an environment of varied conductivity comprizing, an exciting coil adapted for electromagnetic coupling with the environment, a capacitance connected in series with said coil to form an oscillating circuit, a resistance bridge circuit having a first, a second, a third and a fourth resistor connected in series to have current of said oscillating circuit flow from the junction of said first and third resistor to the junction of said second and fourth resistor, said current through said bridge adapted to create a temperature in said resistors corresponding to said current, said first, second and third resistors having a first temperature coefficient of resistance, and said fourth resistor having a second coefficient of resistance, such that a change of potential will be created across the junction of said first and second resistors and the junction of said third and fourth resistors upon a change of current through said oscillating circuit, and amplifier means to supply current in said oscillating circuit in response to said potential change across said bridge.

7. A system for producing a constant electromagnetic flux field in a variably conductive earth formation, comprising, an exciting coil adapted for coupling with said formation connected in series with a capacitor to form an oscillating circuit, a resistance bridge circuit having a first, a second, a third and a fourth resistor connected in series and adapted to have current flow through a first diagonal in response to current flow through said oscillating circuit, said current adapted to create a temperature in said resistors corresponding to said current, said first, second, and third resistors having one temperature coefficient of resistance, and said fourth resistor having another temperature coefficient of resistance, and means to control the current through said oscillating circuit in response to a potential change across a second diagonal of said bridge, said potential being a function of said oscillating circuit current magnitude.

8. In an improved electromagnetic logging system having an exciting coil adapted for coupling with a well formation to produce a constant flux field in said formation, at least one receiver coil longitudinally disposed in separated relation from the exciter coil adapted to produce a voltage in response to eddy currents induced in said formation by said field, and means to transmit an indication of the eddy current produced voltage to a receiving and indicating means, the combination of, means to maintain a constant current through said exciting coil including, a capacitor connected in series with said exciting coil to form an oscillating circuit, the output of a supply means connected in series with the oscillating circuit to drive said circuit in responsive variation to a voltage input to said supply means, a first diagonal of a Wheatstone resistance bridge connected in responsive series relation to the current flowing through the oscillating circuit, said bridge having one resistor of different temperature resistance coefficient than the other three resistors, a second diagonal of the bridge connected to the supply means to provide a control voltage of magnitude responsive to the temperature variation created in said resistors by the current of the oscillating circuit and of frequency established by the oscillating circuit, means responsive to the phase and frequency of the oscillating circuit to separate the voltage induced in said receiver coil by the formation eddy currents from the voltage directly induced in said receiver by said exciting coil and to vary a signal transmission means in response only to said eddy current induced voltage, and a receiving and indicating means to indicate variations of said transmission means.

References Cited in the file of this patent

UNITED STATES PATENTS

| | | |
|---|---|---|
| 2,163,403 | Meacham | June 20, 1939 |
| 2,573,133 | Greer | Oct. 30, 1951 |
| 2,615,956 | Broding | Oct. 28, 1952 |
| 2,725,523 | Doll | Nov. 29, 1955 |